United States Patent [19]

Karasawa

[11] Patent Number: 4,501,661
[45] Date of Patent: Feb. 26, 1985

[54] METHOD AND APPARATUS FOR PURIFICATION AND ACTIVATION OF WATER

[76] Inventor: Masafusa Karasawa, 783-2, Ohaza-Karasugawa, Horiganemura, Minami-azumi-gun, Nagano Prefecture, Japan

[21] Appl. No.: 596,087

[22] Filed: Apr. 3, 1984

[51] Int. Cl.³ .................. B01D 35/06; B03C 1/02; C02F 1/48
[52] U.S. Cl. .................. 210/223; 210/266; 210/283; 210/295; 210/695
[58] Field of Search ........... 210/660, 683, 695, 222, 210/223, 266, 283, 284, 294, 295

[56] References Cited

U.S. PATENT DOCUMENTS

| | | | |
|---|---|---|---|
| 3,059,910 | 10/1962 | Moriya | 210/222 |
| 3,206,657 | 9/1965 | Moriya | 210/222 |
| 3,356,216 | 12/1967 | Sato | 210/223 |
| 3,379,637 | 4/1968 | O'Brien | 210/222 |
| 3,411,120 | 11/1968 | Miyata | 210/223 |
| 3,462,720 | 8/1969 | Miyata | 210/223 |
| 4,238,326 | 12/1980 | Wolf | 210/223 |
| 4,238,334 | 12/1980 | Halbfoster | 210/679 |
| 4,392,959 | 7/1983 | Coillet | 210/651 |

FOREIGN PATENT DOCUMENTS

| | | | |
|---|---|---|---|
| 804638 | 11/1958 | United Kingdom | 210/223 |
| 2116077 | 8/1983 | United Kingdom | 210/222 |
| 904760 | 2/1982 | U.S.S.R. | 210/222 |

Primary Examiner—Ernest G. Therkorn
Attorney, Agent, or Firm—Browdy and Neimark

[57] ABSTRACT

A method and an apparatus for purification and activation of water not only from a water purification plant but also from other sources by passing water through dechloration zone, to eliminate chlorine ion, activation zone to disorder the equilibrium state of water and ionize the water and settlement zone to disturb the ionic balance of the ionized water and make it oriented to be softened successively.

2 Claims, 3 Drawing Figures

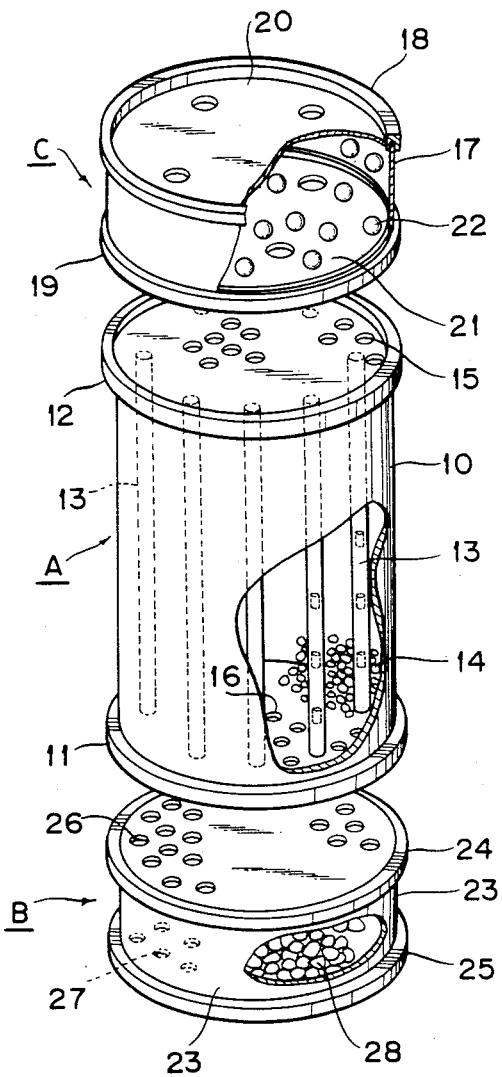
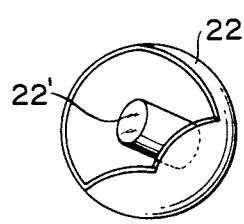
FIG.2
FIG.3

METHOD AND APPARATUS FOR PURIFICATION AND ACTIVATION OF WATER

BACKGROUND OF THE INVENTION

The present invention relates to a method and apparatus for purification and activation of water.

Following an increase in population and gradual centralization of habitants in a given place an issue of daily water has become more serious, and in order to satisfy the increased needs of daily water under such circumstance another sources should be newly found or established. But any case usually depends on rivers which have been from day to day polluted with changes in environments. For such water to be acceptable as daily water it must be greatly treated with mechanical and/or chemical meanses to be fungi-free clean at a water purification plant, but the results often invite an effect that such treated water become unfit to drink far from so-called natural water being.

Particularly in city area and in case of multistoried building such treated water is first taken up to an overhead storage tank usually placed on the top of the building to be stored then supplied to each habitant.

Therefore, during being stored in the tank the quality of that water will be aged and occasionally polluted with unexpected accidents so that it would become unfit to drink. The best way to solve these problems is, all things being taken together, to have river water kept clean, but it is extremely difficult to solve the issue at a stroke because doing so requires enormous amount of costs.

There have been provided many proposals for water from a water purification plant to be treated so as to be closing to natural water having reasonable tastes without disagreeable orders caused by chlorine etc. Most of these proposals are of column filter in a small scale for home use in which an adsorbent such as activated carbon is used.

Such column filter is in fact suitable so long as the purpose lies only in purification of water to be distilled-like water, but even in that case in order to obtain a large quantity of such pure water within short time it is required that its scale should be extensive, which becomes costly. In addition to this problem there is an inevitable big problem in any event that water as exhausted has no taste and is not fitted as daily water to drink.

Under these circumstances, there is now a social demand to provide an economical, practical and simple means having combined abilities of purifying and of activating water that the water as resulted be clean and rich in taste like natural water.

The present invention has been completed as the results of repeated experiments in many ways in a long period of time by the present inventor and is in reply to said social demand.

OBJECT OF THE INVENTION

The principal object of the present invention is to provide a method and apparatus for purifying and activating water not only from a water purification plant but also from other sources by passing such water through magnetic field given by magnetic polyelementary mineral and magnet wherein purification and activation of water is simultaneously conducted.

Another object is the provision of a simplified apparatus applicable for large scale use and also for home use for simultaneously conducting purification and activation of water from a water purification plant or from other sources to obtain natural-like water being fungi-free clean and rich in taste and minerals.

Still another object is to provide a method for simultaneously conducting purification and activation of water from a water purification plant or from other sources to be closing to natural water, which is fungi-free clean and rich in taste and minerals.

SUMMARY OF THE INVENTION

The foregoing objects are attained, according to the present invention, by utilizing a method and apparatus whereby city running water or other kind water is passed and, if necessary recycled, through dechloration zone, activation zone then settlement zone successively. Each zone is in the form of a cylindrical column of the same diameter and the three zones are usually united with connection means to an unit.

As the dechloration zone is to adsorb free chlorine and to decompose combined chlorine of water it is essential for water such as city running water which is chlorated but not always for other water. In the dechloration zone an agent in porous granular form having an ability to decompose combined chlorine to free chlorine and to adsorb free chlorine such as calcic ceramics is charged. For this purpose, for an example, calcic ceramic which is obtained from shells of a shell animal such as shell-fish by treating them at ultrahigh temperature according to conventional method may be also used.

The activation zone consists of charged particles of magnetic multielementary mineral i.e. macrocrystalline granite porphyry commonly called Elvan ("Bakuhanseki" in Japanese name) and magnet bars being installed longitudinally among said particles. water is, while staying in the activation zone, disordered with its equilibrium state and ionized thereby to be activated. The water exhausted from the activation zone will be neutral or weak-alkaline and rich in minerals.

The settlement zone is to disturb the ionic balance of water which is given by the activation zone and to make water oriented to be softened. In the settlement zone plural numbers of magnet ball are charged. The water exhausted from the settlement zone will be absolutely clean, fungi-free, and mild, and also accompanied with agreeable taste and odor. The thus finally obtained water becomes close to natural mineral water and willingly acceptable as daily-life water to drink.

The temperature for treatment of water in any zone is not particularly limited but is preferred to be room temperature or little higher particularly for attaining sufficient activation of water in the activation zone. The feed of water to be treated to the apparatus according to the present invention may be carried out usually simply by hydraulic pressure of water supplied through service pipe in case of city running water, but for other water feed water pump is used. The flow rate of water through the apparatus will be varied according to the kind of water to be treated. When the scale of the activation zone is of 1.0 m (height)×0.3 m (diameter) it will be sufficient to be about 2 tons per an hour for usual city running water. But if that water is lesser visible or contaminated it should be lowered or recycled to the apparatus.

In an alternative, the apparatus according to the present invention may be a multiple column apparatus. The multiple column apparatus is effective in a local place where running water is not provided. For the multiple column apparatus the dechloration zone is necessary only in first column but not in successive column.

In the apparatus of the present invention, it is required to replace dechloration zone, activation zone and settlement zone respectively by new one in order to secure its function in attaining expected purification and activation of water after certain amount of water to be treated has been passed. The function of the activation zone has a great influence on the quality of water as resulted, so that it is advisable to replace the activation zone more oftenly in comparison with other zones. The time when is necessary to replace the activation zone may be found out by checking the property of exhausted water from the apparatus with relevant means such as measurement of specific resistance of water or litmus paper test. Usually, if the property of said exhausted water has been changed into acidic side at least the activation zone is replaced by new one.

BRIEF DESCRIPTION OF THE DRAWINGS

FIG. 2 is a disassembled view of water purification and activation column of the apparatus.

FIG. 3 is a partially sectioned view of a magnet ball to be charged in the water settlement zone of said column.

DESCRIPTION OF THE PREFERRED EMBODIMENT

Figure 1:
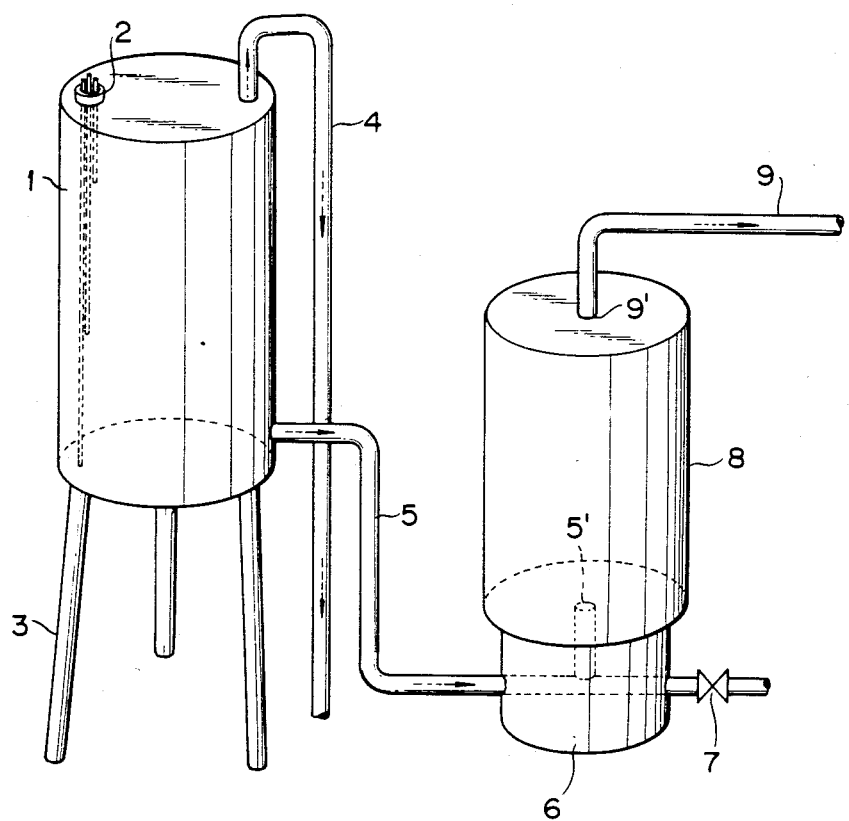
FIG. 1 is a general view showing the entire appearance of the single column apparatus for purification and activation of water for city running water according to the present invention.

For a better understanding of the present invention, reference is now made to the following description taken in connection with the accompanying drawings, in which all like parts are designated by like reference characters. The following description is directed to treatment of water from a storage tank connected to city running water service pipe, but this is only an example, so that the present invention shall not be understood to be limited to that case. 1 stands for overhead storage tank placed on the top of a building which is connected to city running water service pipe. 2 is electrode bar for controlling water level. 3,3,3 are supporting legs. 4 stands for water-lifting pipe being connected to said water service pipe through which city-running water is introduced into overhead storage tank 1. 5 shows a conduit of feeding water from overhead storage tank 1 to water purification and activation column 8 which is supported by a column supporting base 6. 5' shows an inlet upwardly branched from conduit 5 which introduce water through conduit 5 into said column 8. 7 shows a water drain valve provided with the outer end of conduit 5 for draining water where necessary. Water purification and activation column 8 has a housing wall of for example stainless steel which houses dechloration zone B, activation zone A and settlement zone C, a water inlet 5' at the middle of the bottom and an outlet 9' at the middle of the top to exhaust treated water through conduit 9 connected to said outlet. Over or within conduit 5 and/or conduit 5 relevant infrared ray radiation means such as infrared lamp for purpose of sterilizing water may be provided.

Water purification and activation column are consisting of dechloration zone B, activation zone A and settlement zone C. These three zones are water-tightly linked each other with seal-linking means such as rubber packing. The lower part of said column namely dechloration zone B is water-tightly attached to the bottom of portion of internal side wall face of housing 8 through rubber packing 25 with its bottom edge. And the upper part of said column namely settlement zone C is also water-tightly attached to the top portion of internal side wall face of housing 8 through rubber packing 18 with its upper edge.

Dechloration zone B is to adsorb free chlorine and decompose combined chlorine of water and comprises upper wall 26, lower wall 27 respectively having water-passing perforations and non-perforated side wall 23. Said three walls are water-tightly linked each other with rubber packings 24,25 to form a room which is charged with particles 28 of a dechloration agent. Activation zone A is to disorder the equilibrium state of water and ionize the thus disordered water to be activated. Activation Zone A comprises lower wall 15, upper wall 16 respectively having water-passing perforation and non-perforated side wall 13. And said three walls are water-tightly linked each other with rubber packings 11, 12 to form a room which is charged with particles 14 of magnetic multielementary mineral such as macrocrystalline granite porphyry commonly called Elvan (presently being picked from rocks of mountains of Ena area, Enagun, Gifu prefecture of Japan) and contain magnet bars 13 being vertically installed among said particles 14. The size of said particles 14 is 10 to 20 preferrably 5 to 10 mm of a particle diameter. Magnet bar 13 is in midair of nickel-chromium steel that has 10 to 11 mm of outer-diameter and 8 to 9 mm of inner diameter. In the midair space of said bar a plural number of magnet 13' being 1.0 mm in thickness and 6 to 7 mm in diameter are placed. The number of said magnets to be placed is usually equivalent to an interger corresponding to one third of the height of a magnet bar. The number of said magnet bar to be installed is decided in accordance with the scale of activation zone A and examples of which are as follows:

| Scale of Activation Zone (diameter - mm) | Number of Magnet Bars to be placed |
| --- | --- |
| ~150 | 1 |
| 150< <250 | 4 |
| 250< <350 | 8 |
| 350< <500 | 16 |

The position of magnet bar 13 to be placed among particles 14 is varied according to how many magnet bars are placed. For example, when the number is only one it is vertically placed in the center, and when the number is plural they are placed at such position that the distance between bars concerned and also the distance from a bar to side wall of the zone are just or nearly equilateral.

Settlement zone C is to disturb the ionic balance of water which is given by the activation zone and to make the water oriented to be softened. Settlement zone comprises upper wall 20, lower wall 21 respectively having water-passing perforations and non-perforated side wall 17. And said three walls are water-tightly linked each other with rubber packings 18, 19 to form a room which is charged with magnet balls 22. The magnet ball is a spherical body having a midair structure made of acrylic resin as shown in FIG. 3 and contains magnet pellet 22' in the midair space. The size of the magnet ball is 16 to 20 mm in outer diameter and 12 to 13 mm in inner diameter. The magnet pellet is in cylindrical shape of being 7 mm in diameter and 10 mm in length. The number of said magnet balls to be placed in settlement zone C is at least 3 and will be increased in accordance with the scale of activation zone A for instance 4 for $150 < < 250$ diameter scale, 8 for $250 < < 350$ diameter scale, etc. Dechloration zone B and activation zone A are water-tightly connected by linking rubber packings 24 and 11, and likelihood activation zone A and settlement zone C are water-tightly connected by linking rubber packings 12 and 19.

The foregoing effects of the apparatus for purification and activation of water according to the present invention were confirmed by repeated experiments. For example, when city running water being 6.8 of PH value, containing 150 mg/l of chlorine ion and having disagreeable taste and odor was passed at a flow rate of 1.5 tons per hour through the apparatus being a scale of 1.0 m (height)×0.3 m (diameter) for activation zone A, the water as resulted was found to be such that the content of chlorine ion was significantly reduced to 10 mg/l, the PH value was increased to 7.1, disagreeable taste and odor disappeared and in return agreeable taste and order was added, the contents of minerals were increased, the visibility was absolute and was completely from fungi.

It was also found that the water as resulted was very close to natural clean water obtained from natural spring in mountainous place.

What is claimed is:

1. An apparatus for purification and activation of water which comprises dechloration zone charged with an agent having an ability to decompose combined chlorine to free chlorine and to adsorb free chlorine, activation zone to disorder the equilibrium state of water and ionize the thus disordered water wherein particles of magnetic multielementary mineral and one or more magnet bars containing magnets in a midair space are installed among said particles and settlement zone charged with a means to disturb the ionic balance of water and to make the water oriented to be softened.

2. An apparatus according to claim 1, wherein the means is a magnet ball of a spherical body having a midair structure containing magnet pellets.

* * * * *